United States Patent [19]

Boland

[11] Patent Number: 4,458,717

[45] Date of Patent: Jul. 10, 1984

[54] CYLINDER CUSHION SEAL

[75] Inventor: John D. Boland, Jackson, Mich.

[73] Assignee: Aeroquip Corporation, Jackson, Mich.

[21] Appl. No.: 474,985

[22] Filed: Mar. 14, 1983

[51] Int. Cl.³ .......................... F16K 15/08; F15B 15/22

[52] U.S. Cl. .................................. 137/496; 137/528; 277/177; 91/26; 91/396

[58] Field of Search .................... 91/394, 395, 396, 26; 277/177; 137/496, 528

[56] References Cited

U.S. PATENT DOCUMENTS

| | | | |
|---|---|---|---|
| Re. 24,532 | 9/1958 | Halladay et al. | 91/394 |
| 2,704,996 | 3/1955 | Peterson et al. | 91/26 |
| 2,710,595 | 6/1955 | Peterson et al. | 91/26 |
| 2,719,510 | 7/1955 | Elder | 91/26 |
| 2,755,775 | 7/1956 | Flick et al. | 91/26 |
| 2,804,052 | 8/1957 | Halladay et al. | 91/26 |
| 2,853,974 | 9/1958 | Hewitt | 91/26 |
| 2,935,047 | 5/1960 | Ortman et al. | 91/396 |
| 3,267,815 | 8/1966 | Ortman et al. | 91/26 |
| 3,440,930 | 4/1969 | Olson | 91/396 |
| 3,626,807 | 12/1971 | Shartzer | 91/1 |
| 3,805,672 | 4/1974 | Pekrul | 91/396 |
| 4,301,714 | 11/1981 | Stenlund et al. | 91/394 |

FOREIGN PATENT DOCUMENTS

| | | | |
|---|---|---|---|
| 4948 | 10/1979 | European Pat. Off. | 91/394 |
| 2152641 | 5/1972 | Fed. Rep. of Germany | 91/396 |

*Primary Examiner*—Paul E. Maslousky
*Attorney, Agent, or Firm*—Beaman & Beaman

[57] ABSTRACT

A synthetic plastic cushion seal for an expansible chamber motor usable with either an air or oil pressurized medium, the seal having reduced friction characteristics, being of a concise configuration and utilizing radial and axial channels to facilitate medium flow during pressurization of the associated motor chamber.

3 Claims, 7 Drawing Figures

CYLINDER CUSHION SEAL

BACKGROUND OF THE INVENTION

Expansible chamber motors using pressurized air or hydraulic oil commonly utilize cushioning structure to prevent deleterious impact of the piston components with the motor heads at the termination of a stroke. Such cushion structure usually includes a passage defined in a motor head, usually concentric with the cylinder, through which exhausted medium passes. This exhaust passage receives a valve member affixed to piston structure as the piston approaches the head wherein the valve member restricts the flow of exhaust medium through the passage slowing the rate of flow of the exhausting medium and utilizing such medium for cushioning purposes at the termination of the piston stroke.

Such cushioning apparatus normally utilizes an annular seal within the passage opening which cooperates with the piston mounted valve member to seal the valve member with respect to the passage during the cushioning phase. Bleed means having a regulatable restricted flow communicate with the cylinder chamber adjacent the head allowing the cushioning medium to be exhausted at a controlled rate thereby permitting the piston to move through its full stroke, yet at a reduced velocity, to control the engagement between the piston components and the motor head.

When pressurizing the chamber, the pressurized medium is imposed upon the cushioning apparatus, and it is known to construct the passage seal ring in such a manner that medium flow about the seal is permitted to pressurize the adjacent motor chamber, and initiate piston movement. Various seal configurations have been utilized to improve the operating and life expectancy of cushion seal apparatus, including seal rings, and typical cushioned expansible motor constructions are shown in the assignee's U.S. Pat. Nos. 2,719,510 and 2,804,052 and in U.S. Pat. Nos. 2,704,996; 2,710,595; 2,755,775; 2,853,974; 3,267,815; 3,626,807; 3,805,672 and 4,088,061.

Presently available cushioning apparatus of the aforementioned type often impose friction upon the piston structure which increases the pressure required to initiate piston movement, and such seals are often of the lip seal type which necessitates that the pressurized medium be sufficient to raise the lip seal before significant flow through the seal is possible. Also, known cushioning apparatus is relatively expensive to manufacture, and is not of such a concise configuration as to readily permit the associated motor head to accommodate bleed off structure. Further, the installation of cushion structure of the known type into expansible chamber motors is relatively complex and time consuming, and if the assembly is not properly achieved failure of the cushion structure will readily occur.

It is an object of the invention to provide cushion seal structure for an expansible chamber motor wherein the seal has improved friction reducing characteristics and permits pressurized medium to bypass the seal at lower pressures than usual.

A further object of the invention is to provide a cushion seal for an expansible chamber motor wherein the seal results in a shorter cycle time lag during operation and the seal may be readily assembled into a permanent groove within the motor head and is maintained therein by the normal configuration of the seal.

An additional object of the invention is to provide a cushion seal for an expansible chamber motor which is formed of a synthetic plastic material, is economical to manufacture and has a long effective operating life, and is capable of permitting relatively high medium flow rates to circumvent the seal during pressurization of the adjacent cylinder chamber.

In the practice of the invention the head of an expansible chamber motor includes a concentric fluid passage through which pressurized medium enters the associated cylinder chamber, and is exhausted therefrom. An annular groove defined in this passage receives a synthetic plastic cushion seal, such as formed of urethane, and the seal includes an inner bore generally of conical configuration which cooperates with a cylindrical valve member mounted upon the piston structure which enters the passage as the piston approaches the cylinder head.

The seal includes a radial face adapted to engage and seal against the passage groove during exhausting of the pressurized medium, and bleed passages formed in the head permit the pressurized medium which has produced a cushioning effect to be bled from the cylinder at a controlled rate.

When pressurized medium is to be introduced into the adjacent cylinder chamber, the cushion seal permits medium flow therearound due to axial displacement of the seal ring which disengages the seal ring radial surface from the passage groove face. Axial channels defined in the seal circumference communicate with radial channels defined in the seal face nearest the piston wherein the channels are capable of handling a relatively large capacity flow of pressurized medium to initiate piston movement facilitating withdrawal of the valve from the head passage.

The bore of the seal is of a conical-cylindrical configuration wherein a limited area of engagement exists between the seal and valve and the characteristics of the seal are such as to minimize frictional drag between the seal and valve components, and minimize the frictional resistance of pressurized medium flowing therearound.

The flexible and resilient characteristics of the seal permits the seal to be readily deformed for assembly purposes into the motor head, yet the seal configuration, and the associated head groove, prevent "roll out" of the seal from the groove due to frictional or pressure forces thereon.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
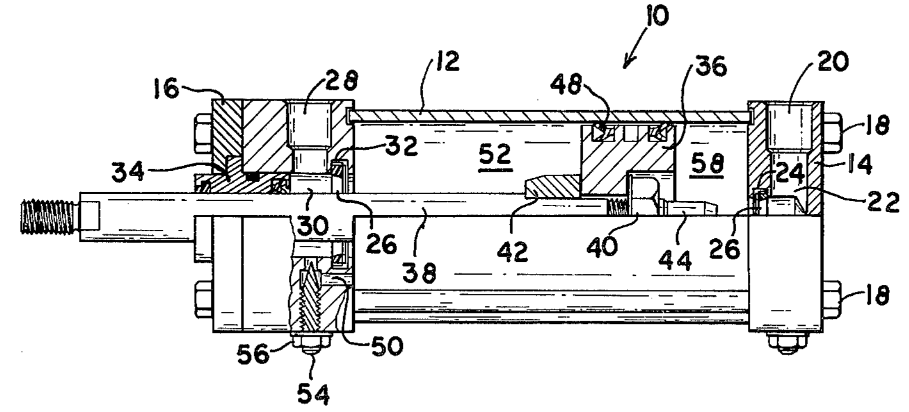
FIG. 1 is an elevational view, partially in diametrical section, illustrating an expansible chamber motor utilizing cushion seal means in accord with the invention.
Figure 2:
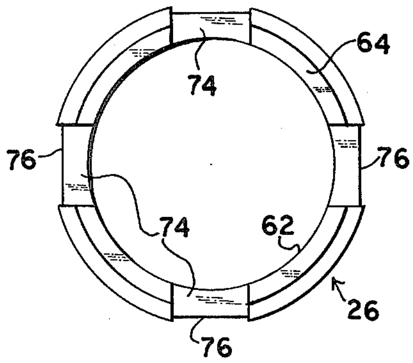
FIG. 2 is an enlarged, detailed, elevational view of the inner face of a cushion seal as constructed in accord with the invention.
Figure 3:
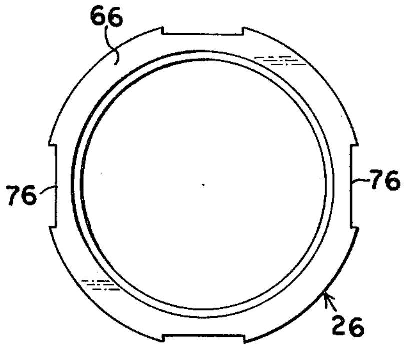
FIG. 3 is an elevational, enlarged view of the outer face of the cushion seal.
Figure 4:
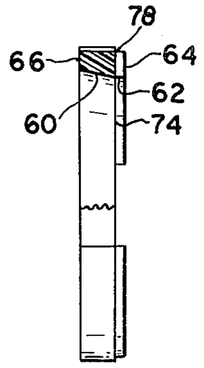
FIG. 4 is an end elevational view as taken from the left of FIG. 3, the upper half of the seal being shown in section.
Figure 5:
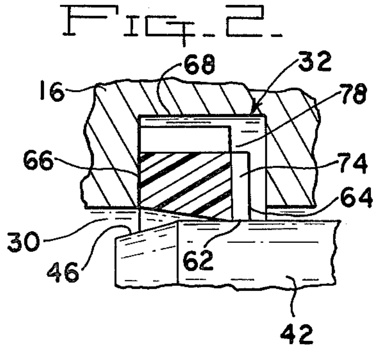
FIG. 5 is a detail, sectional view of the cushion seal and head groove and valve illustrating the position of the seal during cushioning.
Figure 6:
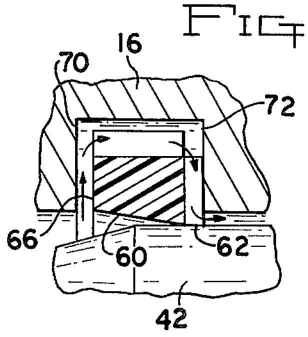
FIG. 6 is an enlarged, detail, sectional view similar to FIG. 5 illustrating the relationship of the components during fluid bypass of the seal.

A typical expansible chamber motor utilizing the cushion seal of the invention is illustrated in FIG. 1. The motor 10 includes a cylindrical cylinder 12 closed at each end by a head 14, and a head 16 through which the piston rod extends. The heads are sealingly mounted upon the cylinder 12 by tie rods 18.

The head 14 includes a threaded port 20 in communication with coaxial passage 22 in which cushion seal groove 24 is formed which receives the cushion seal 26. Likewise, the head 16 includes threaded port 28 communicating with coaxial passage 30 in which annular groove 32 is located for receiving an identical cushion seal 26. A piston rod gland 34 is mounted upon the head 16 by the associated tie rods 18.

The piston 36 is affixed to the piston rod 38 by a nut 40 which maintains the assembly of the piston and annular valve 42 upon the rod. The innermost end of the rod includes valve 44, and the valves 42 and 44 are of a similar construction, each being of a cylindrical form and including a conical seal aligning surface 46. The valves 42 and 44 are fixed on the piston rod, and as appreciated from FIG. 1, are disposed adjacent the piston 36 which is sealed with respect to the inner surface of the cylinder 12 by the usual annular piston rings 48.

Bleed off of the cushioning medium to the left of the piston 36, FIG. 1, is through bleed passage 50 which communicates with the cylinder chamber 52 and the passage 30. The rate of medium flow through the passage 50 is regulated by needle valve 54 whose position is locked by the lock nut 56.

The general operation of the illustrated expansible chamber motor and cushions is similar to that described in the aforementioned patents. For instance, pressurizing of the cylinder chamber 58 to the right of piston 36 through passage 22 causes the piston to move toward the head 16 at a rate dependent upon the rate of pressurization of the medium on the right of the piston. As the piston moves towards head 16 the valve 42 enters the passage 30, coaxially aligns the cushion seal 26 with the valve due to the presence of surface 46, and the reception of the valve within the passage 30 restricts the flow of exhausting medium through the passage slowing the rate of movement of the piston and piston rod 38. Thereupon, the rate of movement of the piston towards the head 16 is determined by the rate of flow of the medium through the bleed off passage 50, and piston movement will terminate upon engagement of the piston with the head 16.

Upon the supplying of a pressurized medium to port 28 and passage 30, and exhausting the medium through head 14, the forces imposed upon the valve 42 and piston 36 move the piston and piston rod 38 toward head 14 reversing the aforedescribed procedure. Cushioning of the piston rod as it approaches head 14 is accomplished by reception of the valve 44 into the sealed passage 22. A bleed passage, not shown, may be utilized in the head 14.

The details of construction of the cushion seal 26 are best appreciated from FIGS. 2–6. The seal consists of an annular ring of synthetic plastic material, preferably urethane having a 70 Durometer. The seal includes an inner bore having a conical surface portion 60, and a cylindrical surface portion 62. The axial dimension of the seal is defined by an outer radial face 66 of a flat configuration, and the inner radial face 64 which is disposed toward the piston. The inner face 64 is also of a planar configuration, and both seal faces are disposed at substantially right angles to the axis of the seal.

The seal circumference is substantially cylindrical, and the seal is of a diameter less than the diameter of the associated head groove cylindrical surface 68. The head groove also includes an outer flat face 70 and an inner flat face 72, both of which are at right angles to the axis of the expansible motor, and the axial separation of the groove faces 70 and 72 is greater than the axial dimension between the seal faces 64 and 66, as will be appreciated from FIGS. 5 and 6.

The seal face 64 is provided with four radial channels 74 which at their innermost end intersect the seal bore portion 62, and at their outermost end each align with an axially extending channel 76 defined in the seal circumference. The circumference channels 76 intersect the seal face 66. The "corner" of the cushion seal as represented by an axial projection of the circumference, and a radial projection of the face 64, is removed, or notched, at 78, wherein a clearance or opening exists at the intersection of the aligned channels 74 and 76 producing a minimum of flow resistance between the channels.

The cushion seal 26 is assembled into the associated head groove 24 or 32 by deforming the seal radially and the seal may be readily installed into its head groove by such deformation, and will accommodate to the groove configuration upon release due to the resilient nature of the seal material.

In use, the cushion seal 26 "floats" within the associated head groove 24 or 32 due to the fact that the diameter of the seal is less than the groove diameter, and the axial seal dimension is less than the groove axial dimension. During cushioning, the seal bore 62 will be initially engaged by the piston valve surface 46, which concentrically aligns the seal with the piston. The frictional engagement between the seal and valve, which is of an interference fit, forces the seal face 66 against the groove face 70, FIG. 5, establishing a sealing relationship between the seal and the groove. Thereupon, the pressure within the exhausting medium in chamber 52, for instance, will maintain the seal in tight relationship with the groove face 70, and as the seal will be firmly engaging the cushion valve 42 the flow of exhaust medium through the passage 30 is terminated, and exhausting of the pressurized medium takes place through the bleed passage 50 during the final stages of cushioning.

To reverse the motor stroke, pressurized medium is supplied to the head 16, and the port 20 becomes an exhaust port. Initial pressurization of the passage 30 will displace the piston rod valve to the right, permitting pressurized medium to flow between the seal 26 and the groove face 70, through the channels 76, and through the radial channels 74, as represented by the arrows in FIG. 6. This simultaneous flow of pressurized medium through the four circumference and inner face channels permits a relatively high volume of pressurized medium to flow into the motor chamber 52 rapidly displacing the piston 36 to the right, and upon clearance of the valve 42 from the seal 26, the full flow capacity of the passage 30 will drive the piston.

The presence of the channels 74 and 76 assures a high "bypass" flow rate about the cushion seal prior to the passage 30 being fully opened, and the seal construction results in a low "breakout" friction and permits a short time lag between cycles of the piston as a lip seal relationship is not present between the seal and valve. As the seal produces a fluid tight seal with the groove face 70 and the valve 42 under the conditions of FIG. 5, effective cushioning is produced, and the rectangular cross section of the seal prevents the seal from being "rolled out" of the associated head groove during high flow capacity through the associated passage during bypass as in FIG. 6.

This type of seal requires little overall radial dimension permitting adequate space within the motor head for the bleed passage, which is a problem with small diameter size expansible chamber motors, and the molded urethane construction is much more economical to produce than many of the fabrication techniques of prior art cushion seals.

Figure 7:
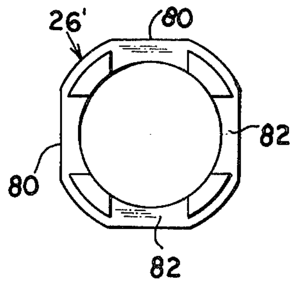
FIG. 7 is an elevational view of the inner face of a modified configuration of cushion seal.

In FIG. 7 a modified form of cushion seal 26' is illustrated wherein the circumferential channels are defined by flats 80 formed in the seal circumference intersecting the seal inner and outer faces. Also, as will be appreciated, the dimension of the aligned radial passages 82 corresponds to the dimensions of the circumferential flats, and this construction permits a seal of small dimension to effectively bypass relatively large volumes of pressurized medium with little restriction.

The aforedescribed cushion seals may be used equally well with pressurized oil or air type expansible chamber motors, and it is appreciated that various modifications to the inventive concepts may be apparent to those skilled in the art without departing from the spirit and scope of the invention.

I claim:

1. A cushion seal for an expansible chamber motor comprising an annular body of elastomeric material having an axis, an inner bore, a circumference, a first radial face and a second radial face, said faces defining the seal body axial dimension and said bore and circumference defining the seal body radial dimension, said body being of a solid construction through said axial and radial dimensions, said bore including a conical surface having a minimum diameter in the direction of said body first face and a maximum dimension adjacent said second face, at least one radial channel defined in said first face intersecting said bore and said circumference, at least one axially extending channel defined in said circumference intersecting said first and second faces, said radial and axial channels being in communication adjacent said body circumference.

2. In a cushion seal for an expansible chamber motor as in claim 1, a plurality of radial channels formed in said first face and a plurality of axially extending channels defined in said circumference, each of said radial channels communicating with an axially extending channel, and an annular notch defined in said body to the intersection of said circumference and said first face to aid in communication between aligned axial and radial channels.

3. In a cushion seal for an expansible chamber motor as in claim 2, said axially extending channels comprising four in number being located at 90° intervals about said body circumference.

* * * * *